United States Patent
Yoshino

(10) Patent No.: US 11,846,400 B2
(45) Date of Patent: Dec. 19, 2023

(54) VEHICLE LAMP

(71) Applicant: KOITO MANUFACTURING CO., LTD., Tokyo (JP)

(72) Inventor: Kimiaki Yoshino, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/926,289

(22) PCT Filed: May 18, 2021

(86) PCT No.: PCT/JP2021/018801
§ 371 (c)(1),
(2) Date: Nov. 18, 2022

(87) PCT Pub. No.: WO2021/241330
PCT Pub. Date: Dec. 2, 2021

(65) Prior Publication Data
US 2023/0213164 A1    Jul. 6, 2023

(30) Foreign Application Priority Data

May 27, 2020   (JP) .................................. 2020-092310

(51) Int. Cl.
*F21S 43/249*    (2018.01)
*F21S 43/245*    (2018.01)
(Continued)

(52) U.S. Cl.
CPC .......... *F21S 43/249* (2018.01); *F21S 43/241* (2018.01); *F21S 43/245* (2018.01); *F21Y 2113/13* (2016.08); *F21Y 2115/10* (2016.08)

(58) Field of Classification Search
CPC ....... F21S 43/249; F21S 43/245; F21S 43/241
See application file for complete search history.

(56) References Cited

U.S. PATENT DOCUMENTS

| 2009/0027911 A1* | 1/2009 | Misawa ................ F21V 7/0091 |
| | | 362/545 |
| 2021/0041083 A1* | 2/2021 | Wakafuji .................. F21V 7/09 |

(Continued)

FOREIGN PATENT DOCUMENTS

| CN | 206724036 U | 12/2017 |
| CN | 207162416 U | 3/2018 |

(Continued)

OTHER PUBLICATIONS

International Search Report dated Jul. 6, 2021 for WO 2021/241330 A1 (4 pages).

(Continued)

*Primary Examiner* — Christopher E Dunay
(74) *Attorney, Agent, or Firm* — Venjuris, P.C.

(57) ABSTRACT

A vehicle lamp includes: a first light source and a second light source having light emission colors different from each other; and a light guide body that receives and emits light from the first light source and the second light source. The light guide body includes an incident portion on which the light is incident, a reflecting portion that reflects the light incident from the incident portion, and an emitting portion that emits the light reflected by the reflecting portion. The reflecting portion includes a plurality of first light distribution control surfaces that reflects the light from the first light source toward a predetermined direction and a plurality of second light distribution control surfaces that reflects the light from the second light source toward the predetermined direction. The plurality of first and second light distribution control surfaces are alternately arranged.

5 Claims, 8 Drawing Sheets

(51) Int. Cl.
*F21S 43/241* (2018.01)
*F21Y 113/13* (2016.01)
*F21Y 115/10* (2016.01)

(56) References Cited

U.S. PATENT DOCUMENTS

| 2021/0123580 A1* | 4/2021 | Yatabe | F21S 43/31 |
| 2021/0231279 A1* | 7/2021 | Ohashi | F21S 41/663 |
| 2022/0307670 A1* | 9/2022 | Zhao | B60Q 1/0058 |
| 2022/0349548 A1* | 11/2022 | Saito | F21S 43/243 |

FOREIGN PATENT DOCUMENTS

| CN | 209026739 U | 6/2019 |
| CN | 210462875 U | 5/2020 |
| CN | 210568139 U | 5/2020 |
| JP | 2015-201278 A | 11/2015 |
| JP | 2019-110049 A | 7/2019 |
| JP | 2019-204616 A | 11/2019 |

OTHER PUBLICATIONS

Extended European Search Report dated Sep. 21, 2023 for European counterpart (EP 21813146.4) of this application (10 pages).

* cited by examiner

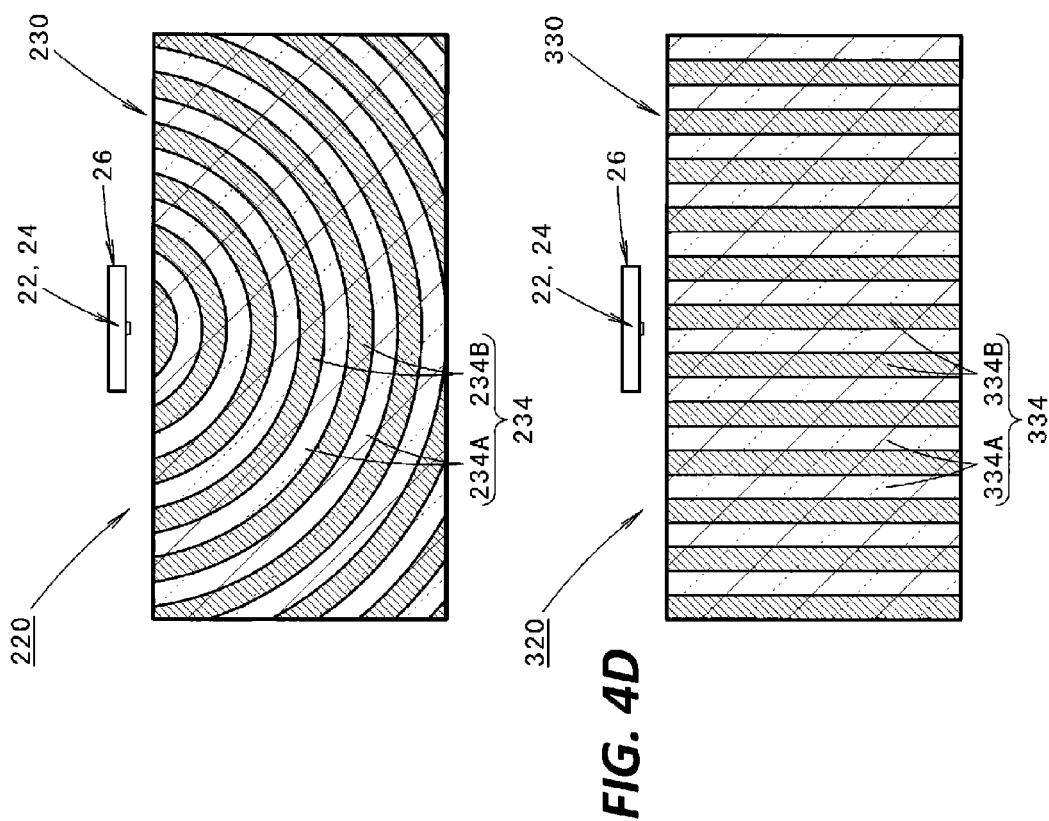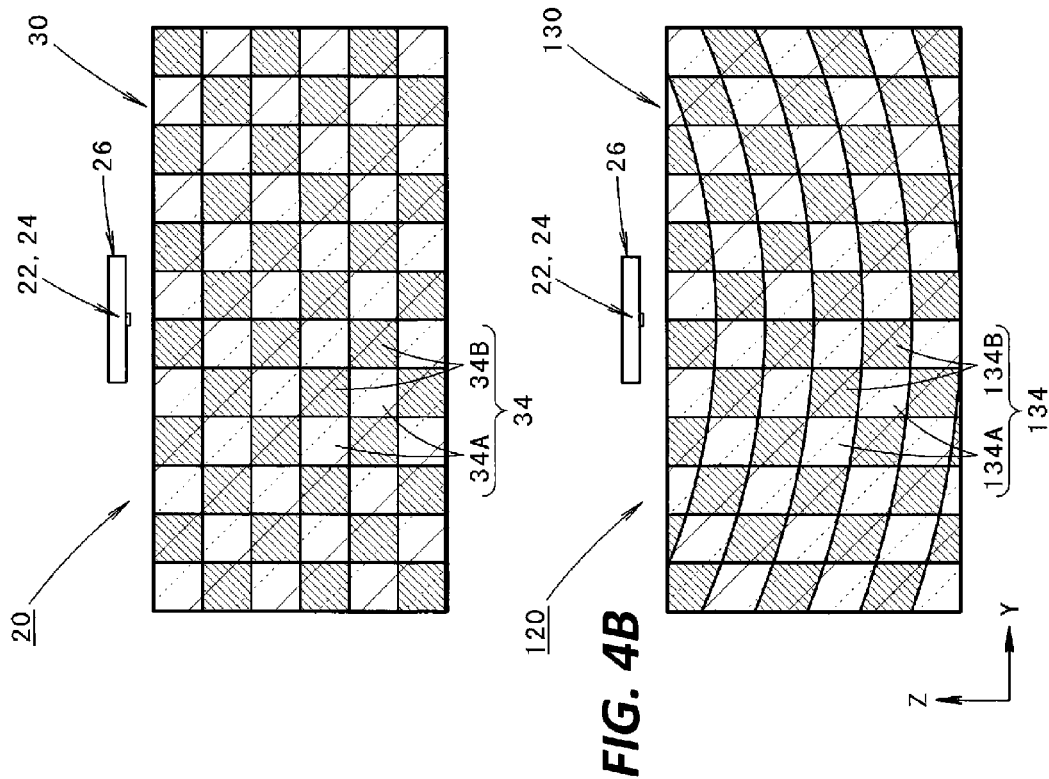

VEHICLE LAMP

CROSS REFERENCE TO RELATED APPLICATIONS

This application is a national phase of PCT application No. PCT/JP2021/018801, filed on 18 May 2021, which claims priority from Japanese patent application No. 2020-092310, filed on 27 May 2020, all of which are incorporated herein by reference.

TECHNICAL FIELD

The present disclosure relates to a vehicle lamp including a light guide body.

BACKGROUND

In the related art, a vehicle lamp configured such that light from a first light source and a second light source having light emission colors different from each other is incident on a light guide body to be emitted has been known.

Patent Document 1 discloses a configuration of such vehicle lamp in which a light guide body includes an incident portion on which light from a first light source and a second light source is incident, a reflecting portion that reflects the light from the first light source and the second light source incident from the incident portion, and an emitting portion that emits the light from the first light source and the second light source reflected by the reflecting portion.

PRIOR ART DOCUMENT

Patent Document

Patent Document 1: Japanese Patent Laid-Open Publication No. 2019-110049

SUMMARY OF THE INVENTION

Problem to be Solved

In the vehicle lamp disclosed in Patent Document 1, the reflecting portion of the light guide body has a reflecting surface shape that uniformly reflects the light from the first light source and the second light source incident from the incident portion. Therefore, it is difficult to make the emitting portion of the light guide body appear to glow substantially uniformly even when either one of the first light source or the second light source is turned on.

The present disclosure has been made in view of such circumstances, and is to provide a vehicle lamp configured such that light from a first light source and a second light source having light emission colors different from each other is incident on a light guide body to be emitted and capable of making an emitting portion of the light guide body appear to glow substantially uniformly even when either one of the first light source or the second light source is turned on.

Means to Solve the Problem

The present disclosure facilitates the achievement of the goal discussed above by investigating the configuration of the light guide body.

That is, the vehicle lamp according to the present disclosure includes: a first light source and a second light source having light emission colors different from each other; and a light guide body that receives light from the first light source and the second light source and emits the light. The light guide body includes an incident portion on which the light from the first light source and the second light source is incident, a reflecting portion that reflects the light from the first light source and the second light source incident from the incident portion, and an emitting portion that emits the light from the first light source and the second light source reflected by the reflecting portion, and the reflecting portion includes a plurality of first light distribution control surfaces that reflects the light from the first light source toward a predetermined direction and a plurality of second light distribution control surfaces that reflects the light from the second light source toward the predetermined direction, and the plurality of first light distribution control surfaces and the plurality of second light distribution control surfaces are configured to be alternately arranged.

The types of the "first light source and the second light source" are not particularly limited, and a specific light emission color of each of them is also not particularly limited.

As long as the "reflecting portion" has a configuration in which a plurality of first light distribution control surfaces and a plurality of second light distribution control surfaces are alternately arranged, the specific arrangement is not particularly limited.

The specific direction of the "predetermined direction" is not particularly limited, and, for example, a front-rear direction, a left-right direction, or an upward-downward direction of the lamp may be adopted.

As long as each "first light distribution control surface" is formed to reflect the light from the first light source toward a predetermined direction, the shape of the specific reflecting surface is not particularly limited.

As long as each "second light distribution control surface" is formed to reflect the light from the second light source toward the predetermined direction, the shape of the specific reflecting surface is not particularly limited.

Effect of the Invention

The vehicle lamp according to the present disclosure is configured such that light from the first light source and the second light source having light emission colors different from each other is incident on the light guide body to be emitted. However, the light guide body is configured to include the plurality of first light distribution control surfaces configured to reflect the light from the first light source toward the predetermined direction and the plurality of second light distribution control surfaces configured to reflect the light from the second light source toward the predetermined direction as the reflecting portion that reflects the light from the first light source and the second light source incident from the incident portion, and the plurality of first light distribution control surfaces and the plurality of second light distribution control surfaces are configured to be alternately arranged, and thus, the following operation effects may be obtained.

That is, when the first light source is turned on, the emitting portion of the light guide body appears to glow brightly by the reflected light from the plurality of first light distribution control surfaces, and when the second light source is turned on, the emitting portion of the light guide body appears to glow brightly by the plurality of second light distribution control surfaces. At this time, by alternately arranging the plurality of first light distribution control surfaces and the plurality of second light distribution control surfaces, even when either one of the first light source or the second light source is turned on, the emitting portion of the light guide body may appear to glow substantially uniformly.

When the first light source is turned on, the light reflected by the plurality of second light distribution control surfaces is not light toward the predetermined direction. However, the reflected direction is different for each second light distribution control surface, and thus, the emitting portion of the light guide body does not appear to locally glow brightly. Therefore, when the first light source is turned on, a state where the emitting portion of the light guide body appears to glow substantially uniformly is maintained by the reflected light from the plurality of first light distribution control surfaces.

In the same manner, when the second light source is turned on, the light reflected by the plurality of first light distribution control surfaces is not light directed to the predetermined direction. However, the reflected direction is different for each first light distribution control surface, and thus, the emitting portion of the light guide body does not appear to locally glow brightly. Therefore, when the second light source is turned on, a state where the emitting portion of the light guide body appears to glow substantially uniformly is maintained by the reflected light from the plurality of second light distribution control surfaces.

In this manner, according to the present disclosure, in the vehicle lamp configured such that light from a first light source and a second light source having light emission colors different from each other is incident on a light guide body to be emitted, it is possible to make the emitting portion of the light guide body appear to glow substantially uniformly even when either one of the first light source or the second light source is turned on.

In the above configuration, when the plurality of first light distribution control surfaces and the plurality of second light distribution control surfaces are two-dimensionally and alternately arranged as the configuration of the reflecting portion, it is possible to improve the effect that the emitting portion of the light guide body appears to glow substantially uniformly even when either one of the first light source or the second light source is turned on.

In the above configuration, after the light guide body is configured to include a secondary reflecting portion that reflects the light from the first light source and the second light source reflected by the reflecting portion toward the emitting portion, the reflecting portion is configured to include a pair of reflecting regions formed to reflect the light from the first light source and the second light source incident from the incident portion in opposite directions, and the secondary reflecting portion is configured to include a common reflecting region that reflects the light from the first light source and the second light source reflected in the pair of reflecting regions, respectively, toward the emitting portion. As a result, it is easily possible to make the emitting portion of the light guide body appear to glow substantially uniformly over a wide area even when either one of the first light source or the second light source is turned on.

At this time, when the pair of reflecting regions that constitute the reflecting portion are configured to be arranged in a symmetrical positional relationship with respect to a straight line connecting a light emission center of the first light source and a light emission center of the second light source, it is possible to make the brightness of the reflected light from each of the pair of reflecting regions even when either one of the first light source or the second light source is turned on. Therefore, it is possible to make the emitting portion of the light guide body appear to glow with substantially the same luminance distribution.

In the above configuration, when each of the first light source and the second light source is constituted by a light emitting element mounted on a common substrate, the first light source and the second light source may be arranged close to each other with a good positional accuracy. Therefore, it is possible to further improve the effect that the emitting portion of the light guide body appears to glow substantially uniformly even when either one of the first light source or the second light source is turned on.

BRIEF DESCRIPTION OF THE DRAWINGS

FIG. 4A is a view viewed from a direction of arrow IVa in FIG. 2, and FIGS. 4B to 4D are views illustrating Modifications 1 to 3 of the first embodiment, which are similar to FIG. 4A.

DETAILED DESCRIPTION TO EXECUTE THE INVENTION

Hereinafter, an embodiment of the present disclosure will be described with reference to drawings.

First, a first embodiment of the present disclosure will be described.

Figure 1:
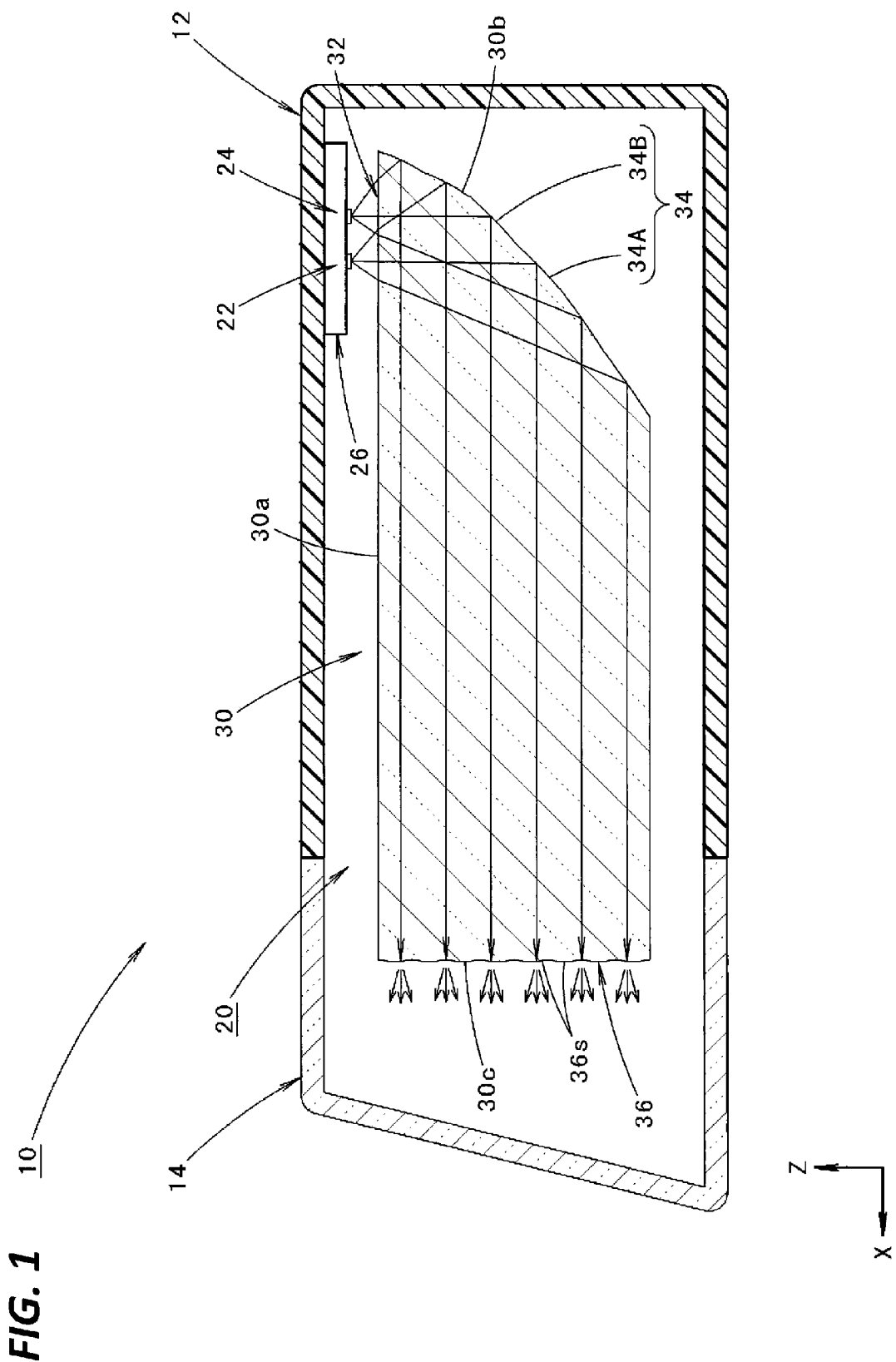
FIG. 1 is a side cross-sectional view illustrating a vehicle lamp according to a first embodiment of the present disclosure.
Figure 2:
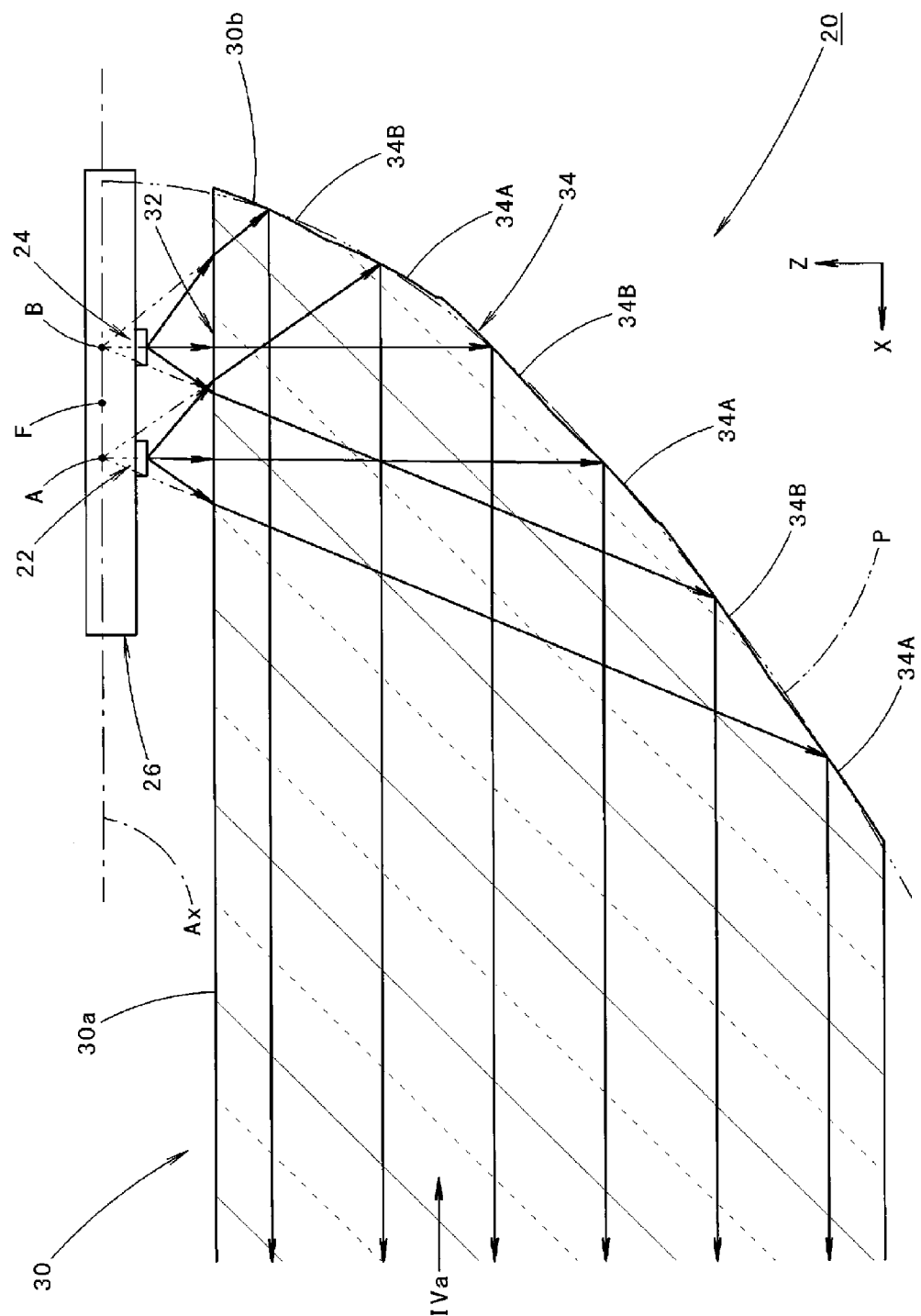
FIG. 2 is a detailed view of a main part in FIG. 1 illustrating a lamp unit of the vehicle lamp.
Figure 3:
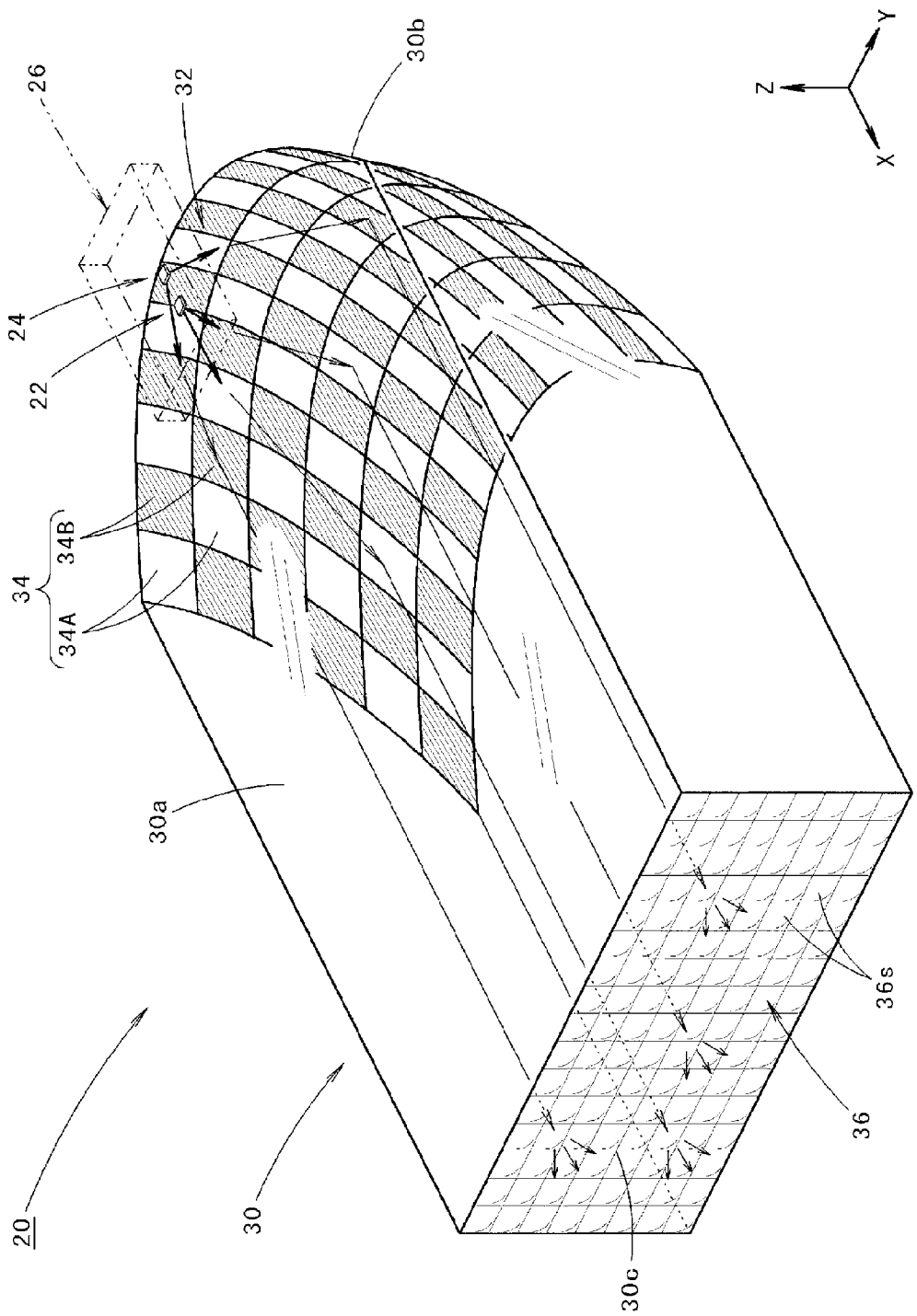
FIG. 3 is a perspective view illustrating the lamp unit.

FIG. 1 is a side cross-sectional view illustrating a vehicle lamp 10 according to the present embodiment. Further, FIG. 2 is a detailed view of a main part in FIG. 1 illustrating a lamp unit 20 of the vehicle lamp 10, and FIG. 3 is a perspective view illustrating the lamp unit 20.

In these drawings, the direction indicated by X is the "front" of the vehicle lamp 10 (also "front" of the vehicle), the direction indicated by Y is the "left direction" ("right direction" when viewed from the front of the lamp), and the direction indicated by Z is the "upward direction." This is also applied to other drawings.

The vehicle lamp 10 according to the embodiment is a lamp provided at a front end portion of a vehicle, and functions as both a front turn signal lamp and a clearance lamp.

As illustrated in FIG. 1, the vehicle lamp 10 is configured such that the lamp unit 20 is attached inside a lamp chamber formed by a lamp body 12 and a transmissive cover 14 that is attached to a front end opening of the lamp body 12 and is transparent.

The lamp unit 20 is configured to include a first light source 22 and a second light source 24 having light emission colors different from each other, and a light guide body 30 on which light from the first light source 22 and the second light source 24 is incident and configured to emit the light.

The first light source 22 is constituted by a light emitting diode that emits light in a white color, and is turned on in a clearance lamp turn-on mode. The second light source 24 is constituted by a light emitting diode that emits light in an amber color, and is turned on in a front turn signal lamp turn-on mode.

The light guide body 30 is constituted by a colorless and transparent plate-shaped resin member (e.g., an acrylic resin member), and is supported by the lamp body 12 via a support structure (not illustrated) in a state of being arranged to extend in the front-rear direction of the lamp along a horizontal plane.

The first light source 22 and the second light source 24 are arranged above the vicinity of a rear end portion of the light guide body 30 in a state where the light emitting surfaces are directed downward. At this time, the first light source 22 and the second light source 24 are mounted on a common substrate 26 with intervals in the front-rear direction of the lamp with the first light source 22 positioned closer to the front side of the lamp. The substrate 26 is supported by the lamp body 12 in a state of being arranged to extend along the horizontal plane.

In the light guide body 30, a rear region of an upper surface 30a constitutes an incident portion 32 on which light from the first light source 22 and the second light source 24 is incident, a rear surface 30b constitutes a reflecting portion 34 that reflects the light from the first light source 22 and the second light source 24 incident from the incident portion 32, and a front surface 30c constitutes an emitting portion 36 that emits the light from the first light source 22 and the second light source 24 reflected by the reflecting portion 34.

The reflecting portion 34 includes a plurality of first light distribution control surfaces 34A that reflects and controls the light from the first light source 22 and a plurality of second light distribution control surfaces 34B that reflects and controls the light from the second light source 24.

As illustrated in FIG. 3, in the reflecting portion 34, the plurality of first light distribution control surfaces 34A and the plurality of second light distribution control surfaces 34B are two-dimensionally and alternately arranged.

FIG. 4A is a view viewed from a direction of arrow IVa in FIG. 2.

As also illustrated in FIG. 4A, the reflecting portion 34 is divided into a square lattice shape when viewed from the front of the lamp, and the first light distribution control surface 34A and the second light distribution control surface 34B are alternately allocated in the horizontal direction and the vertical direction to each of the plurality of rectangular regions formed by this division.

In FIG. 3 and FIG. 4A, in order to make the configuration of the reflecting portion 34 easier to understand, the rectangular regions where the second light distribution control surfaces 34B are positioned are hatched.

As illustrated in FIG. 3, each first light distribution control surface 34A is formed to reflect the light from the first light source 22 incident from the incident portion 32 toward the front direction of the lamp, and each second light distribution control surface 34B is formed to reflect the light from the second light source 24 incident from the incident portion 32 toward the front direction of the lamp.

In order to realize this, as illustrated in FIG. 2, each first light distribution control surface 34A is constituted as a part of a paraboloid of rotation having a virtual point A positioned immediately above a light emission center of the first light source 22 as a focal point and having an axis Ax extending in the front-rear direction of the lamp as a central axis, and each second light distribution control surface 34B is constituted as a part of a paraboloid of rotation having a virtual point B positioned immediately above a light emission center of the second light source 24 as a focal point and having the axis Ax as a central axis.

At this time, each of the first light distribution control surface 34A and the second light distribution control surface 34B is formed having a paraboloid of rotation (curved line indicated by the two-dot chain line in the drawing) as a reference plane P, which has a midpoint of the virtual points A and B as a focal point F and has the axis Ax as a central axis. That is, each first light distribution control surface 34A is configured as a curved surface that is inclined forward with respect to the reference plane P, and each second light distribution control surface 34B is configured as a curved surface inclined backward with respect to the reference plane P.

As illustrated in FIG. 1 and FIG. 3, the front surface 30c of the light guide body 30 extends along a vertical surface orthogonal to the front-rear direction of the lamp, and an emitting portion 36 is configured by forming a plurality of lens elements 36s on the vertical surface.

Specifically, the emitting portion 36 is divided into a square lattice shape when viewed from the front of the lamp, and the lens element 36s having a convex lens shape is allocated to each of the square lattices.

Then, the light guide body 30 is configured to emit the reflected light reached from the reflecting portion 34 at the emitting portion 36 toward the front of the lamp as diffused light that diffuses in the vertical direction and the left-right direction.

At this time, the light from the first light source 22 reflected by the plurality of first light distribution control surfaces 34A reaches the emitting portion 36 as parallel light directed to the front direction of the lamp, and the light from the second light source 24 reflected by the plurality of second light distribution control surfaces 34B reaches the emitting portion 36 as parallel light directed to the front direction of the lamp. Therefore, even when either one of the first light source 22 or the second light source 24 is turned on, when the light guide body 30 is viewed from the front of the lamp, the emitting portion 36 appears to glow brightly.

Further, since the plurality of light distribution control surfaces 34A and the plurality of second light distribution control surfaces 34B are two-dimensionally and alternately arranged in the reflecting portion 34, even when either one of the first light source 22 or the second light source 24 is turned on, the emitting portion 36 appears to glow with substantially the same brightness when viewed from the front of the lamp.

Further, when the first light source 22 is turned on, the reflected light from the plurality of second light distribution control surfaces 34B does not reach the emitting portion 36 as parallel light, but reaches the emitting portion 36 as light reflected in different directions for each second light distribution control surface 34B. Therefore, when viewed from the front of the lamp, the emitting portion 36 does not appear to locally glow brightly, but appears to glow substantially uniformly. In the same manner, when the second light source 24 is turned on, the reflected light from the plurality of first light distribution control surfaces 34A does not reach the emitting portion 36 as parallel light, but reaches the emitting portion 36 as light reflected in different directions for each first light distribution control surface 34A. Therefore, when viewed from the front of the lamp, the emitting portion 36 does not appear to locally glow brightly, but appears to glow substantially uniformly.

Therefore, in the clearance lamp turn-on mode, by turning on the first light source 22, the emitting portion 36 of the light guide body 30 appears to glow brightly in a white color and substantially uniformly. Further, in the front turn signal lamp turn-on mode, by turning on the second light source 24, the emitting portion 36 of the light guide body 30 appears to glow brightly in an amber color and substantially uniformly.

Next, the operational effects of the embodiment will be described.

The vehicle lamp 10 according to the embodiment is configured such that light from the first light source 22 and the second light source 24 having light emission colors different from each other is incident on the light guide body 30 to be emitted. However, the light guide body 30 is configured to include a plurality of first light distribution control surfaces 34A configured to reflect the light from the first light source 22 toward the front direction (predetermined direction) and a plurality of second light distribution control surfaces 34B configured to reflect the light from the second light source 24 toward the front direction as the reflecting portion 34 that reflects the light from the first light source 22 and the second light source 24 incident from the incident portion 32, and the plurality of first light distribution control surfaces 34A and the plurality of second light distribution control surfaces 34B are configured to be alternately arranged, and thus, the following operation effects may be obtained.

That is, when the first light source 22 is turned on, the emitting portion 36 of the light guide body 30 appears to glow brightly by the reflected light from the plurality of first light distribution control surfaces 34A, and when the second light source 24 is turned on, the emitting portion 36 of the light guide body 30 appears to glow brightly by the plurality of second light distribution control surfaces 34B. At this time, by alternately arranging the plurality of first light distribution control surfaces 34A and the plurality of second light distribution control surfaces 34B, even when either one of the first light source 22 or the second light source 24 is turned on, the emitting portion 36 of the light guide body 30 may appear to glow substantially uniformly.

When the first light source 22 is turned on, the light reflected by the plurality of second light distribution control surfaces 34B is not light directed to the front direction of the lamp. However, the reflected direction is different for each second light distribution control surface 34B, and thus, the emitting portion 36 of the light guide body 30 does not appear to locally glow brightly. Therefore, when the first light source 22 is turned on, a state where the emitting portion 36 of the light guide body 30 appears to glow substantially uniformly is maintained by the reflected light from the plurality of first light distribution control surfaces 34A.

In the same manner, when the second light source 24 is turned on, the light reflected by the plurality of first light distribution control surfaces 34A is not light directed to the front direction of the lamp. However, the reflected direction is different for each second light distribution control surface 34A, and thus, the emitting portion 36 of the light guide body 30 does not appear to locally glow brightly. Therefore, when the second light source 24 is turned on, a state where the emitting portion 36 of the light guide body 30 appears to glow substantially uniformly is maintained by the reflected light from the plurality of second light distribution control surfaces 34B.

In this manner, according to the embodiment, in the vehicle lamp 10 configured such that light from the first light source 22 and the second light source 24 having light emission colors different from each other is incident on the light guide body 30 to be emitted, it is possible to make the emitting portion 36 of the light guide body 30 appear to glow substantially uniformly even when either one of the first light source 22 or the second light source 24 is turned on.

Additionally, in the embodiment, as the configuration of the reflecting portion 34 of the light guide body 30, the plurality of first light distribution control surfaces 34A and the plurality of second light distribution control surfaces 34B are two-dimensionally and alternately arranged, and thus, it is possible to improve the effect that the emitting portion 36 of the light guide body 30 appears to glow substantially uniformly even when either one of the first light source 22 or the second light source 24 is turned on.

Further, in the embodiment, since each of the first light source 22 and the second light source 24 is mounted on the common substrate 26, the first light source 22 and the second light source 24 may be arranged close to each other with a good positional accuracy. Therefore, it is possible to further improve the effect that the emitting portion 36 of the light guide body 30 appears to glow substantially uniformly even when either one of the first light source 22 or the second light source 24 is turned on.

In the first embodiment, it has been described that a plurality of first light distribution control surfaces 34A and a plurality of second light distribution control surfaces 34B are alternately arranged in a square lattice shape when viewed from the front of the lamp. However, for example, it is possible to alternately arrange them in an inclined lattice shape when viewed from the front of the lamp. Further, a plurality of first light distribution control surfaces 34A and a plurality of second light distribution control surfaces 34B may be one-dimensionally and alternately arranged (i.e., in a stripe shape).

In the first embodiment, it has been described that the vehicle lamp 10 functions both as a front turn signal lamp and a clearance lamp, but other combinations are possible. For example, it is possible to configure to function both as a tail lamp and a backup lamp.

Next, Modifications of the first embodiment will be described.

First, Modification 1 of the first embodiment will be described.

FIG. 4B is a view illustrating a lamp unit 120 according to this Modification, which is similar to FIG. 4A.

As illustrated in FIG. 4B, the basic configuration of this Modification is similar to the case of the first embodiment, but the configuration of a reflecting portion 134 of a light guide body 130 is partially different from the case of the first embodiment.

That is, also in the light guide body 130 of this Modification, the reflecting portion 134 has a configuration in which a plurality of first light distribution control surfaces 134A and a plurality of second light distribution control surfaces 134B are two-dimensionally and alternately arranged. However, at this time, the first light distribution control surface 134A and the second light distribution control surface 134B are allocated in each of a plurality of regions divided by a plurality of vertical lines and a plurality of downwardly convex curved lines when viewed from the front of the lamp.

Also when adopting the configuration of this Modification, by alternately arranging the plurality of first light distribution control surfaces 134A and the plurality of second light distribution control surfaces 134B, even when either one of the first light source 22 or the second light source 24 is turned on, the emitting portion of the light guide body 130 may appear to glow substantially uniformly.

Next, Modification 2 of the first embodiment will be described.

FIG. 4C is a view illustrating a lamp unit 220 according to this Modification, which is similar to FIG. 4A.

As illustrated in FIG. 4C, the basic configuration of this Modification is similar to the case of the first embodiment, but the configuration of a reflecting portion 234 of a light guide body 230 is partially different from the case of the first embodiment.

That is, in the light guide body 230 of this Modification, the reflecting portion 234 is configured such that a first light distribution control surface 234A of a plurality of first light distribution control surfaces 234A and a second light distribution control surface 234B of a plurality of second light distribution control surfaces 234B are alternately allocated in a plurality of stripe-shaped regions concentrically divided around a point (specifically, the virtual points A and B illustrated in FIG. 2) positioned above in the vicinity of the first light source 22 and the second light source 24 when viewed from the front of the lamp.

Also when adopting the configuration of this Modification, by alternately arranging the plurality of first light distribution control surfaces 234A and the plurality of second light distribution control surfaces 234B, even when either one of the first light source 22 or the second light source 24 is turned on, the emitting portion of the light guide body 230 may appear to glow substantially uniformly.

Next, Modification 3 of the first embodiment will be described.

FIG. 4D is a view illustrating a lamp unit 320 according to this Modification, which is similar to FIG. 4A.

As illustrated in FIG. 4D, the basic configuration of this Modification is similar to the case of the first embodiment, but the configuration of a reflecting portion 334 of a light guide body 330 is partially different from the case of the first embodiment.

That is, in the light guide body 330 of this Modification, the reflecting portion 334 is configured such that a first light distribution control surface 334A of a plurality of first light distribution control surfaces 334A and a second light distribution control surface 334B of a plurality of second light distribution control surfaces 334B are alternately allocated in a plurality of stripe-shaped regions divided into a longitudinal stripe shape when viewed from the front of the lamp.

Also when adopting the configuration of this Modification, by alternately arranging the plurality of first light distribution control surfaces 334A and the plurality of second light distribution control surfaces 334B, even when either one of the first light source 22 or the second light source 24 is turned on, the emitting portion of the light guide body 330 may appear to glow substantially uniformly.

Next, a second embodiment of the present disclosure will be described.

Figure 5:
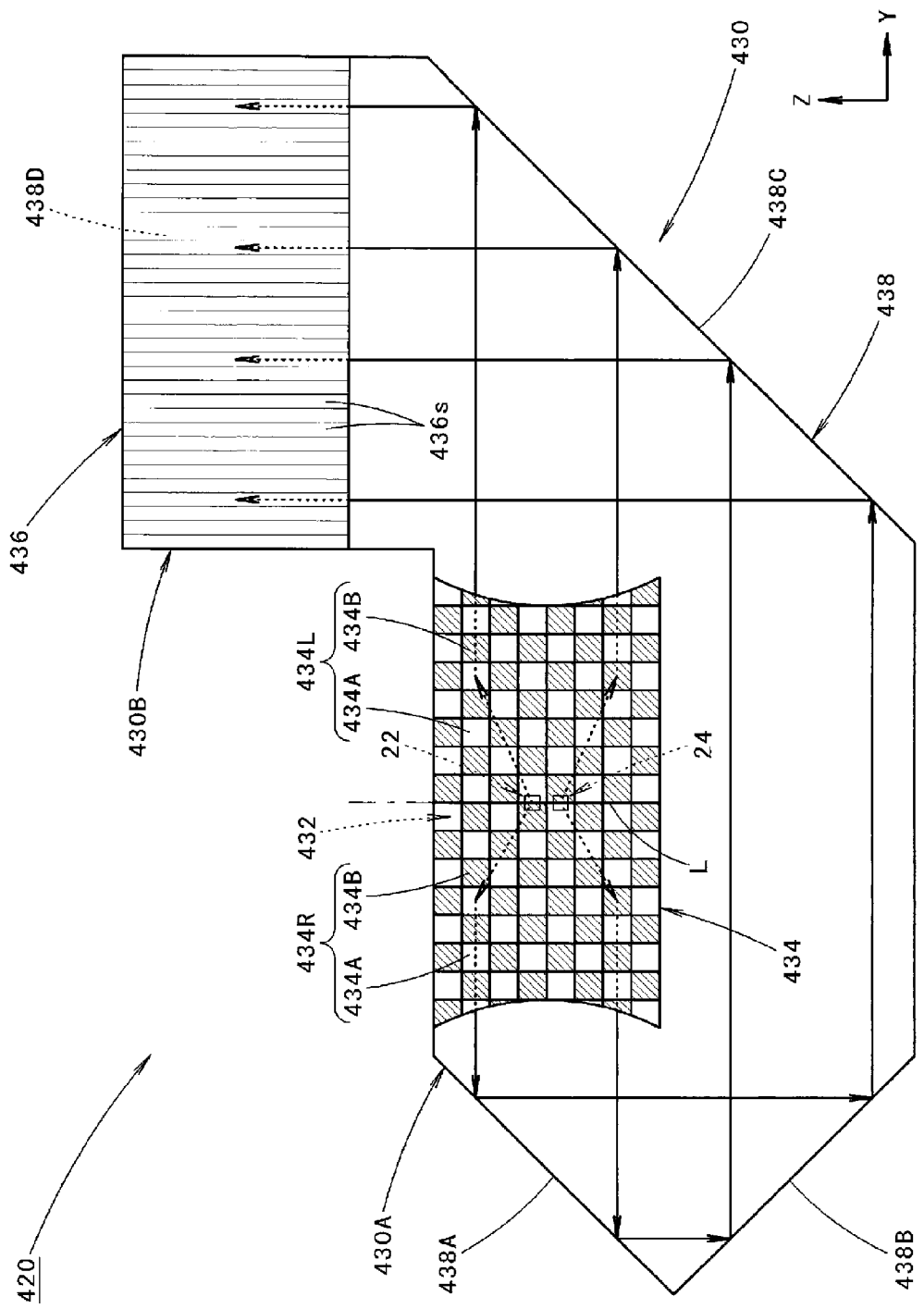
FIG. 5 is a front view illustrating a lamp unit according to a second embodiment of the present disclosure.

FIG. 5 is a front view illustrating a lamp unit 420 according to the present embodiment. Further, FIG. 6 is a perspective view illustrating the lamp unit 420 viewed obliquely from below.

Figure 6:
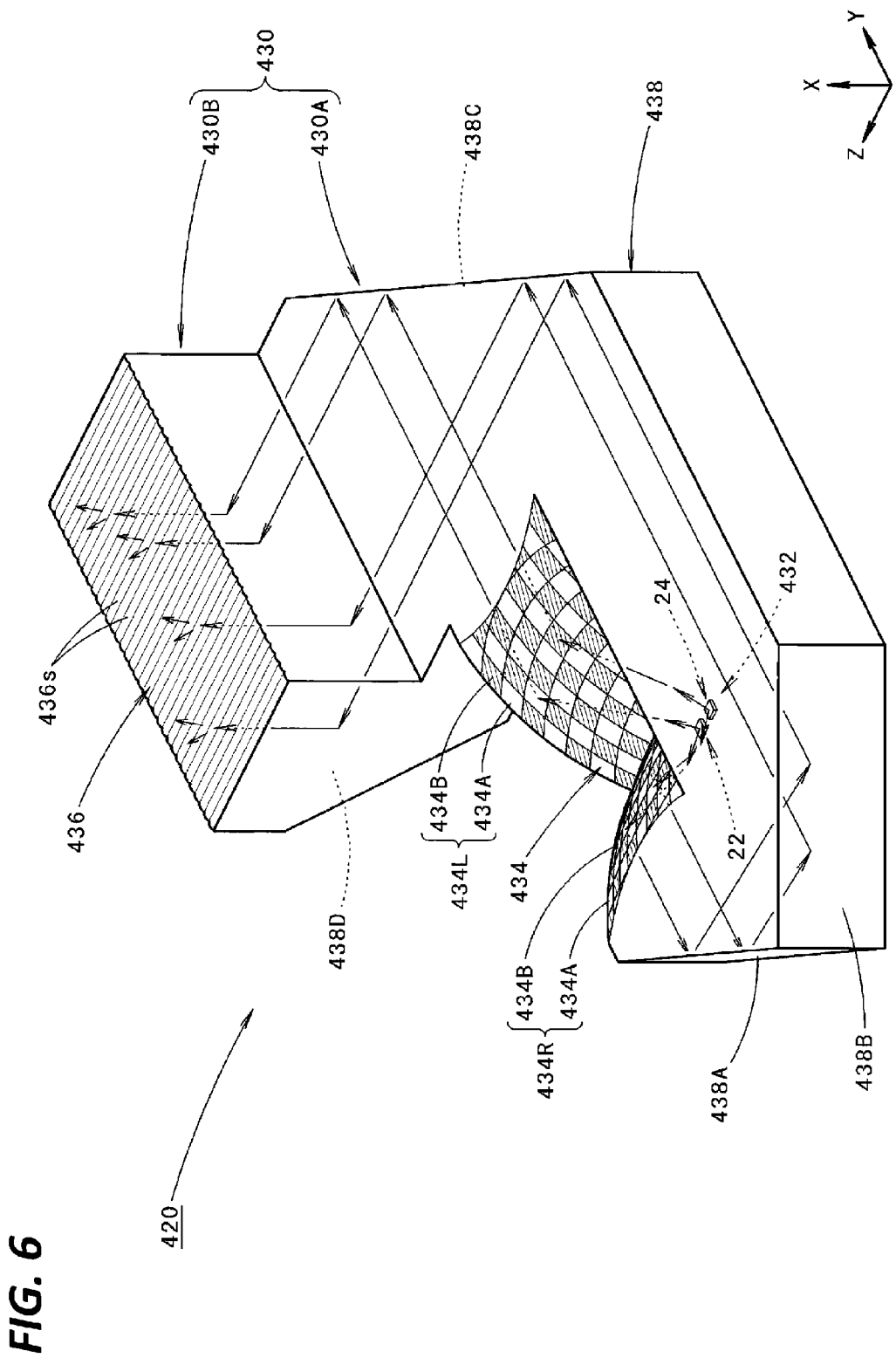
FIG. 6 is a perspective view illustrating the lamp unit according to the second embodiment.

As illustrated in FIGS. 5 and 6, the lamp unit 420 according to the present embodiment is also configured to include the first light source 22 and the second light source 24 having light emission colors different from each other, and a light guide body 430 on which light from the first light source 22 and the second light source 24 is incident and configured to emit the light.

The light guide body 430 is constituted by a colorless and transparent resin member, and includes a flat plate portion 430A extending in a plate shape along the vertical plane orthogonal to the front-rear direction of the lamp, and a front protruding portion 430B that protrudes from the flat plate portion 430A to the front side of the lamp.

The configuration itself of the first light source 22 and the second light source 24 is the same as the case the first embodiment, but the arrangement is different from the case of the first embodiment.

That is, the first light source 22 and the second light source 24 of the present embodiment are arranged with intervals in the vertical direction in the vicinity of a rear of the flat plate portion 430A of the light guide body 430 in a state where the light emitting surfaces are directed to the front direction of the lamp. At this time, the first light source 22 and the second light source 24 are supported by a common substrate (not illustrated) in a state where the first light source 22 is arranged to be positioned on the upper side.

The light guide body 430 includes an incident portion 432 on which light from the first light source 22 and the second light source 24 is incident, a reflecting portion 434 that reflects the light from the first light source 22 and the second light source 24 incident from the incident portion 432, a secondary reflecting portion 438 that reflects the light from the first light source 22 and the second light source 24 reflected by the reflecting portion 434 toward a emitting portion 436, and the emitting portion 436 that emits the light from the first light source 22 and the second light source 24 reflected by the secondary reflecting portion 438 toward the front of the lamp.

The incident portion 432 is constituted by the region in the vicinity of the first light source 22 and the second light source 24 on the rear surface of the flat plate portion 430A. The reflecting portion 434 is constituted by the region in the vicinity of the incident portion 432 on the front surface of the flat plate portion 430A. The secondary reflecting portion 438 is constituted by the outer peripheral surface of the flat plate portion 430A and the rear surface of the front protruding portion 430B. The emitting portion 436 is constituted by the front surface of the front protruding portion 430B.

The reflecting portion 434 is constituted by a pair of left and right reflecting regions 434L and 434R formed to reflect the light from the first light source and the second light source incident from the incident portion 432 to mutually opposite directions (specifically, in both left and right directions).

At this time, as illustrated in FIG. 5, the pair of left and right reflecting regions 434L and 434R are arranged in a bisymmetrical positional relationship with respect to a straight line (i.e., vertical line) L connecting light emission centers of the first light source 22 and the second light source 24.

In each of the reflecting regions 434L and 434R, a plurality of first light distribution control surfaces 434A and a plurality of second light distribution control surfaces 434B are two-dimensionally and alternately arranged. Specifically, each of the reflecting regions 434L and 434R has the same configuration as the configuration (see FIG. 4B) of the reflecting portion 134 of the light guide body 130 of the lamp unit 120 according to Modification 1 of the first embodiment.

That is, in the reflecting region 434L positioned on the left side (right side when viewed from the front of the lamp), the light from the first light source 22 incident from the incident portion 432 is reflected as parallel light toward the left direction by each first light distribution control surface 434A, and the light from the second light source 24 incident from the incident portion 432 is reflected as parallel light toward the left direction by each second light distribution control surface 434B.

Further, in the reflecting region 434R positioned on the right side, the light from the first light source 22 incident from the incident portion 432 is reflected as parallel light toward the right direction by each first light distribution control surface 434A, and the light from the second light source 24 incident from the incident portion 432 is reflected as parallel light toward the right direction by each second light distribution control surface 434B.

In FIGS. 5 and 6, in order to make the configuration of each of the reflecting regions 434L and 434R easier to understand, the rectangular regions where the second light distribution control surfaces 434B are positioned are hatched.

The secondary reflecting portion 438 includes a reflecting region 438A that specularly reflects light from the first light source 22 and the second light source 24 reflected by the reflecting region 434R on the right side downwardly, a reflecting region 438B that specularly reflects the reflected light from the reflecting region 438A toward the left direction, a reflecting region 438C that specularly reflects the reflected light from the reflecting region 438B toward the upward direction, and a reflecting region 438D that specularly reflects the reflected light from the reflecting region 438C toward the front of the lamp.

At this time, the secondary reflecting portion 438 is configured to specularly reflect the light from the first light source 22 and the second light source 24 reflected by the reflecting region 434L on the left side upwardly in the reflecting region 438C, and specularly reflect the light to the front of the lamp in the reflecting region 438D.

A front surface 430Ba of the front protruding portion 430B of the light guide body 430 extends along the vertical plane orthogonal to the front-rear direction of the lamp, and the emitting portion 436 is configured by forming a plurality of lens elements 436s on the vertical plane.

Specifically, the emitting portion 436 is divided into a longitudinal stripe shape when viewed from the front of the lamp, and the lens element 436s having a convex cylindrical lens shape is allocated to each of the longitudinal stripes.

Then, the light guide body 430 is configured to emit the reflected light reached from the reflecting region 438D of the secondary reflecting portion 438 at the emitting portion 436 toward the front of the lamp as diffused light that diffuses in the left-right direction.

The reflecting regions 438C and 438D of the secondary reflecting portion 438 are configured as common reflecting regions that reflect the light from the first light source 22 and the second light source 24 reflected by each of the pair of left and right reflecting regions 434L and 434R toward the emitting portion 436.

Also when adopting the configuration of the present embodiment, each of the pair of left and right reflecting regions 434L and 434R that constitute the reflecting portion 434 of the light guide body 430 has the configuration in which a plurality of light distribution control surfaces 434A and a plurality of second light distribution control surfaces 434B are alternately arranged, and thus, it is possible to make the emitting portion 436 of the light guide body 430 appear to glow substantially uniformly even when either one of the first light source 22 or the second light source 24 is turned on.

At this time, also in the present embodiment, each of the reflecting regions 434L and 434R has the configuration in which the plurality of first light distribution control surfaces 434A and the plurality of second light distribution control surfaces 434B are two-dimensionally and alternately arranged, and thus, it is possible to improve the effect that the emitting portion 436 of the light guide body 430 appears to glow substantially uniformly even when either one of the first light source 22 or the second light source 24 is turned on.

Further, the light guide body 430 of the present embodiment includes the secondary reflecting portion 438 that reflects the light from the first light source 22 and the second light source 24 reflected from the reflecting portion 434 toward the emitting portion 436, the reflecting portion 434 includes the pair of left and right reflecting regions 434L and 434R formed to reflect the light from the first light source 22 and the second light source 24 incident from the incident portion 432 in opposite directions, and the secondary reflecting portion 438 includes the common reflecting regions 438C and 438D that reflect the light from the first light source 22 and the second light source 24 reflected by each of the pair of left and right reflecting regions 434L and 434R toward the emitting portion 436. Therefore, it is easily possible to make the emitting portion 436 of the light guide body 430 appear to glow substantially uniformly over a wide area even when either one of the first light source 22 or the second light source 24 is turned on.

Additionally, since the pair of left and right reflecting regions 434L and 434R are arranged in a bisymmetrical positional relationship with respect to the straight line L connecting the light emission centers of the first light source 22 and the second light source 24, it is possible to make the brightness of the reflected light from each of the pair of left and right reflecting regions 434L and 434R even when either one of the first light source 22 or the second light source 24 is turned on. Therefore, it is possible to make the emitting portion 436 of the light guide body 430 appear to glow with substantially the same luminance distribution.

Next, a third embodiment of the present disclosure will be described.

Figure 7:
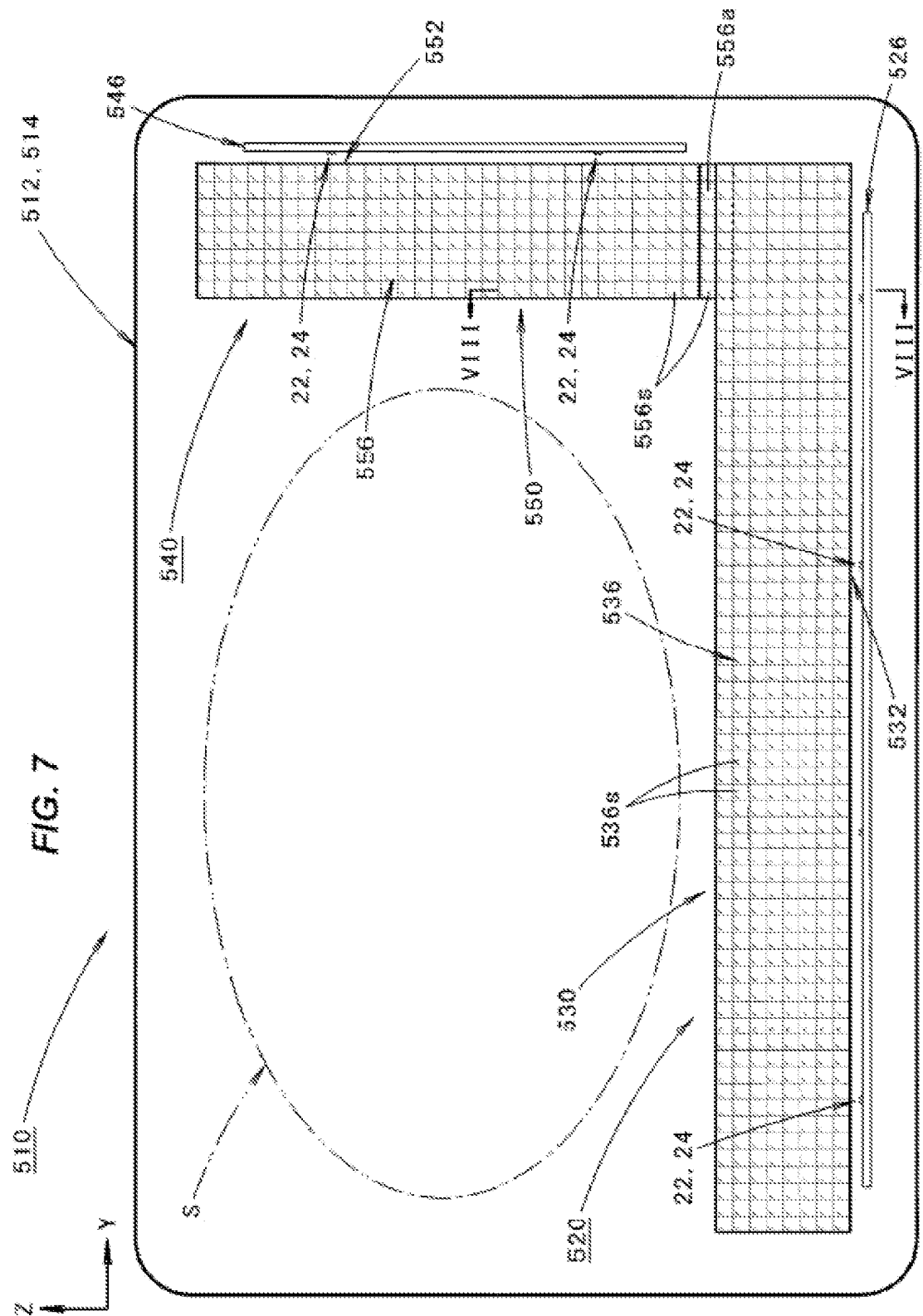
FIG. 7 is a front view illustrating a vehicle lamp according to a third embodiment of the present disclosure.

FIG. 7 is a front view illustrating a vehicle lamp 510 according to the present embodiment. Further, FIG. 8 is a cross-sectional view taken along line VIII-VIII in FIG. 7.

Figure 8:
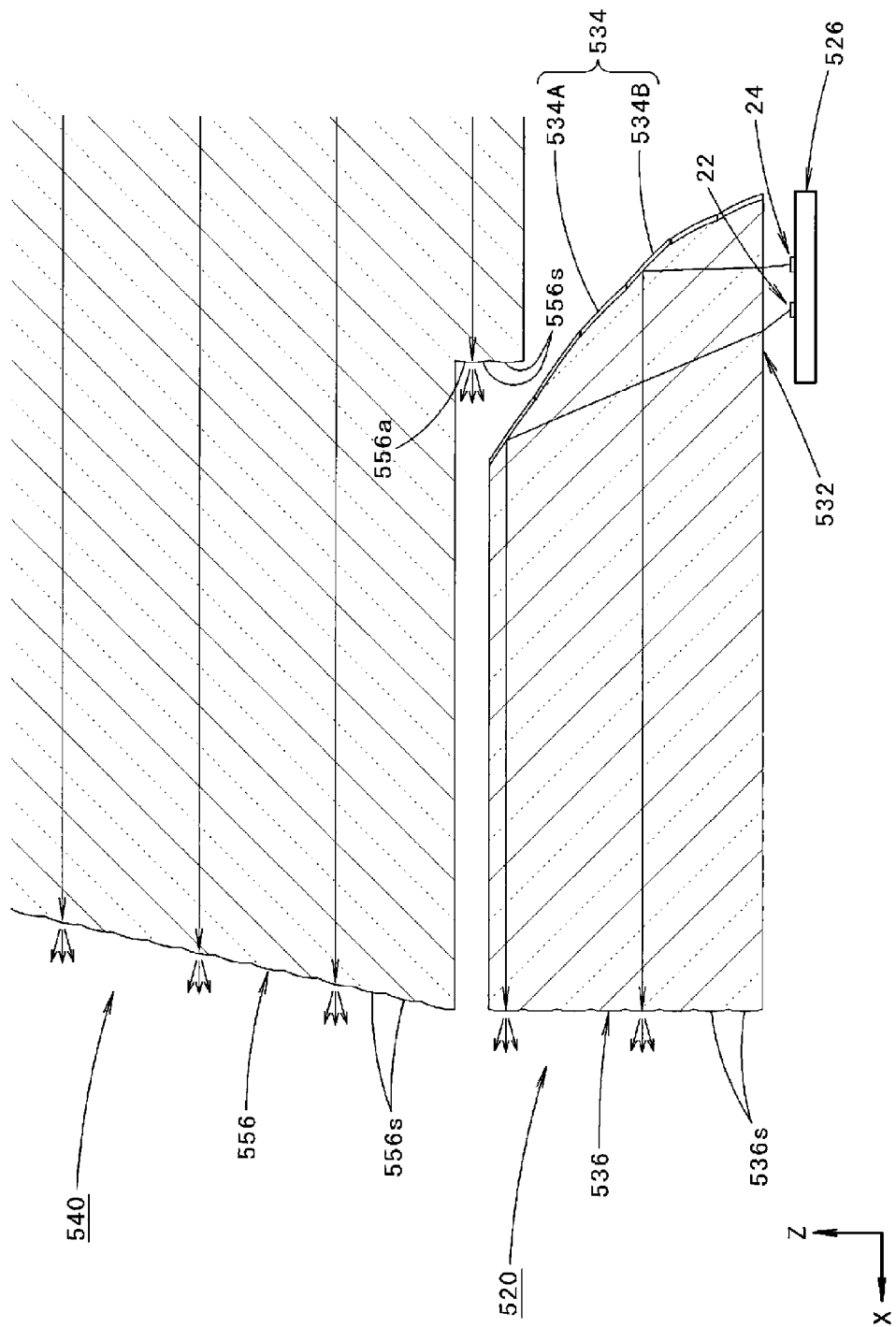
FIG. 8 is a cross-sectional view taken along line VIII-VIII in FIG. 7.

As illustrated in FIGS. 7 and 8, the vehicle lamp 510 according to the present embodiment is configured such that a first lamp unit 520 and a second lamp unit 540 are attached inside a lamp chamber formed by a lamp body 512 and a transmissive cover 514 that is attached to a front end opening of the lamp body 512 and is transparent.

The first lamp unit 520 and the second lamp unit 540 function as both a front turn signal lamp and a clearance lamp, similar to the lamp unit 20 of the first embodiment. Then, the first lamp unit 520 and the second lamp unit 540 are arranged in the lamp chamber to surround an arrangement space (space indicated by the two-dot chain line in FIG. 7) S for other lamp units having a function of a head lamp in an L shape.

That is, the first lamp unit 520 is arranged to extend in the horizontal direction in the lower area in the lamp chamber, and the second lamp unit 540 is arranged to extend from the left end portion (right end portion when viewed from the front of the lamp) of the first lamp unit 520 to the upward direction.

In the first lamp unit 520, four lamp units having the same configuration as that of the lamp unit 20 of the first embodiment are integrated in a vertically inverted state and in an aligned state in the left-right direction.

That is, in the first lamp unit 520, four sets of first light source 22 and second light source 24 are mounted on a common substrate 526 side by side with constant intervals in the left-right direction. Further, in a light guide body 530, four light guide bodies having the same configuration as that of the light guide body 30 of the first embodiment are integrally formed side by side in the left-right direction above the four sets of first light source 22 and second light source 24.

Then, the light guide body 530 is configured to reflect the light from the first light source 22 and the second light source 24 incident on incident portions 532 at four locations to the front of the lamp by reflecting portions 534 (see FIG. 8) at four locations, and then, to emit the light from a common emitting portion 536 toward the front of the lamp.

As illustrated in FIG. 8, each reflecting portion 534 is constituted by a plurality of first light distribution control surfaces 534A and a plurality of second light distribution control surfaces 534B. Further, the emitting portion 536 is divided into a square lattice shape, and a lens element 536s having a convex lens shape is allocated to each of the square lattices.

Meanwhile, in the second lamp unit 540, two lamp units having substantially the same configuration as that of the lamp unit 20 of the first embodiment are integrated in a state of being directed laterally and in an aligned state in the vertical direction.

That is, in the second lamp unit 540, two sets of first light source 22 and second light source 24 are mounted on a common substrate 546 side by side with constant intervals in the vertical direction. Further, in a light guide body 550, two light guide bodies having the same configuration as that of the light guide body 30 of the first embodiment are integrally formed side by side in the vertical direction.

Then, the light guide body 550 is configured to reflect the light from the first light source 22 and the second light source 24 incident on incident portions 552 at two locations to the front of the lamp by reflecting portions (not illustrated) at two locations, and then, to emit the light from a common emitting portion 556 toward the front of the lamp.

In the second lamp unit 540, the light guide body 550 is arranged to be partially overlapped with the light guide body 530 of the first lamp unit 520 when viewed from the front of the lamp.

At this time, in the light guide body 550 of the second lamp unit 540, a lower end edge region 556a of the emitting portion 556 is displaced on the rear side of the lamp, thereby avoiding interference with the light guide body 530 of the first lamp unit 520.

That is, in the emitting portion 556 of the light guide body 550, the lower end edge region 556a is formed to extend along the vertical plane in the vicinity of the rear of the lamp with respect to the light guide body 530 of the first lamp unit 520, and the general region other than the lower edge region 556a is formed to extend upwardly from the vicinity of the upper portion of the emitting portion 536 of the light guide body 530 of the first lamp unit 520 in a slightly rearwardly inclined direction.

Further, the emitting portion 556 is divided into a square lattice shape, and a lens element 556s having a convex lens shape is allocated to each of the square lattices. The lens element 556s of a plurality of lens elements 556s, which forms a two-stepped portion, is formed in the lower end edge region 556a.

At this time, the overlapping portion between the light guide body 530 of the first lamp unit 520 and the light guide body 550 of the second lamp unit 540 is set to a height of the one step of the plurality of lens elements 556s, and a gap corresponding to one step of the plurality of lens elements 556s is formed between the light guide body 530 and the light guide body 550.

When adopting the configuration of the present embodiment, similar to the case of the first embodiment, even when any one of a plurality of sets of the first light source 22 and the second light source 24 of the first lamp unit 520 and the second lamp unit 540 is turned on, it is possible to make the entire emitting portions 536 and 556 of the light guides 530 and 550 appear to glow substantially uniformly.

At this time, although the gap corresponding to one step of the plurality of lens elements 556s is formed between the light guide body 530 and the light guide body 550, the light guide body 530 and the light guide body 550 overlap each other by the height corresponding to two steps. Therefore, the gap between the light guide body 530 and the light guide body 550 does not look dark when the lamp is turned on, and may be made to appear to glow substantially uniformly with other portions.

The numerical values shown as specifications in the embodiment and the Modifications thereof are merely examples, and, of course, the numerical values may be appropriately set to different values.

Further, the present disclosure is not limited to the configurations described in the above embodiments and Modifications thereof, and configurations with various other changes may be adopted.

The above descriptions on the specific embodiments of the present disclosure are presented for purposes of illustration. The descriptions are not intended to be exhaustive or to limit the present disclosure to the precise form as described. It will be apparent to those skilled in the art that various modifications and variations are possible in light of the above descriptions.

DESCRIPTION OF SYMBOLS

- 10: vehicle lamp
- 12: lamp body
- 14: transmissive cover
- 20, 120, 220, 320: lamp unit
- 22: first light source
- 24: second light source
- 26: substrate
- 30, 130, 230, 330, 430: light guide body
- 30a: upper surface
- 30b: rear surface
- 30c: front surface
- 32: incident portion
- 34, 134, 234, 334: reflecting portion
- 34A, 134A, 234A, 334A: first light distribution control surface
- 34B, 134B, 234B, 334B: second light distribution control surface
- 36: emitting portion 36s: lens element
- 420: lamp unit
- 430A: flat plate portion
- 430B: front protruding portion
- 430Ba: front surface
- 432: incident portion
- 434: reflecting portion
- 434A: first light distribution control surface
- 434B: second light distribution control surface 434L, 434R, 438A, 438B, 438C, 438D: reflecting region
436: emitting portion
436s: lens element
438: secondary reflecting portion
510: vehicle lamp
512: lamp body
514: transmissive cover
520: first lamp unit
526, 546: substrate
530, 550: light guide body
532, 552: incident portion
534: reflecting portion
534A: first light distribution control surface
534B: second light distribution control surface
536, 556: emitting portion
536s, 556s: lens element
540: second lamp unit
556a: lower end edge region
A, B: virtual point
Ax: axis
F: focal point
L: straight line
P: reference plane
S: arrangement space for other lamp units

What is claimed is:

1. A vehicle lamp comprising:
a first light source and a second light source having light emission colors different from each other; and
a light guide body configured to receive and emit light from the first light source and the second light source,
wherein the light guide body includes an incident portion having a planar surface on which the light from the first light source and the second light source is incident, a reflecting portion having a continuous reflecting surface with a curved shape that reflects both the light from the first light source and the second light source directly incident from the incident portion, and an emitting portion that emits the light from the first light source and the second light source reflected by the reflecting portion, and
the reflecting portion includes a plurality of first light distribution control surfaces configured to reflect the light from the first light source toward a predetermined direction and a plurality of second light distribution control surfaces configured to reflect the light from the second light source toward the predetermined direction, and the plurality of first light distribution control surfaces and the plurality of second light distribution control surfaces are both arranged in alternating sections along the continuous reflecting surface of the reflecting portion.

2. The vehicle lamp according to claim 1, wherein the plurality of first light distribution control surfaces and the plurality of second light distribution control surfaces are two-dimensionally and arranged in the alternating sections of the reflecting surface of the reflecting portion.

3. The vehicle lamp according to claim 1, wherein the light guide body includes a secondary reflecting portion that reflects the light from the first light source and the second light source reflected by the continuous reflecting surface of the reflecting portion toward the emitting portion,
the reflecting surface includes a pair of adjacent reflecting regions formed to reflect the light from the first light source and the second light source incident from the planar surface of the incident portion in opposite directions, and
the secondary reflecting portion includes a common reflecting region that reflects the light from the first light source and the second light source reflected in the pair of reflecting regions, respectively, toward the emitting portion.

4. The vehicle lamp according to claim 3, wherein the pair of adjacent reflecting regions that constitute the continuous reflecting surface of the reflecting portion are arranged in a symmetrical positional relationship with respect to a straight line connecting a light emission center of the first light source and a light emission center of the second light source.

5. The vehicle lamp according to claim 1, wherein each of the first light source and the second light source is constituted by a light emitting element mounted on a common substrate.

* * * * *